(12) United States Patent
Sarpoolaki

(10) Patent No.: US 9,720,077 B1
(45) Date of Patent: Aug. 1, 2017

(54) RADIO ALTIMETER FOR DETECTING ACCURATE HEIGHT

(71) Applicant: Rockwell Collins, Inc., Cedar Rapids, IA (US)

(72) Inventor: Madjid N. Sarpoolaki, Melbourne, FL (US)

(73) Assignee: Rockwell Collins, Inc., Cedar Rapids, IA (US)

(*) Notice: Subject to any disclaimer, the term of this patent is extended or adjusted under 35 U.S.C. 154(b) by 352 days.

(21) Appl. No.: 14/255,399

(22) Filed: Apr. 17, 2014

(51) Int. Cl.
| | |
|---|---|
| *G01S 13/08* | (2006.01) |
| *G01S 13/02* | (2006.01) |
| *G01S 13/95* | (2006.01) |
| *G01S 13/88* | (2006.01) |
| *G01S 7/34* | (2006.01) |

(52) U.S. Cl.
CPC ............ *G01S 13/02* (2013.01); *G01S 13/882* (2013.01); *G01S 13/953* (2013.01); *G01S 7/34* (2013.01)

(58) Field of Classification Search
CPC ......... G01S 13/882; G01S 7/34; G01S 13/953
USPC .................................. 342/91, 92, 120–122
See application file for complete search history.

(56) References Cited

U.S. PATENT DOCUMENTS

| | | | | |
|---|---|---|---|---|
| 4,509,050 A | * | 4/1985 | Amoroso, Jr. ............ | G01S 7/34 342/205 |
| 7,095,364 B1 | * | 8/2006 | Rawdon .................. | G01S 13/08 342/118 |
| 2005/0270226 A1 | * | 12/2005 | Hager ....................... | G01S 7/34 342/120 |
| 2006/0145912 A1 | * | 7/2006 | Makkapati .............. | G01S 7/003 342/26 R |
| 2008/0074308 A1 | * | 3/2008 | Becker ..................... | G01S 7/34 342/120 |
| 2009/0262008 A1 | * | 10/2009 | Thomas ................. | G01S 13/882 342/120 |
| 2010/0052919 A1 | * | 3/2010 | Mills ....................... | G01W 1/04 340/602 |
| 2015/0145720 A1 | * | 5/2015 | Matthews ............. | G01S 5/0247 342/357.36 |

* cited by examiner

*Primary Examiner* — Marcus Windrich
(74) *Attorney, Agent, or Firm* — Angel N. Gerdzhikov; Donna P. Suchy; Daniel M. Barbieri

(57) ABSTRACT

A method and system for adjusting a gain from a receiver antenna. The method may include accessing a radio altimeter data structure for antenna gain data. The antenna gain data may be associated with one or more antennas including a receiver antenna. Additionally, the method may include receiving aircraft maneuver data from a reference system. Furthermore, the method may include adjusting a gain from the receiver antenna based at least on the aircraft maneuver data.

10 Claims, 12 Drawing Sheets

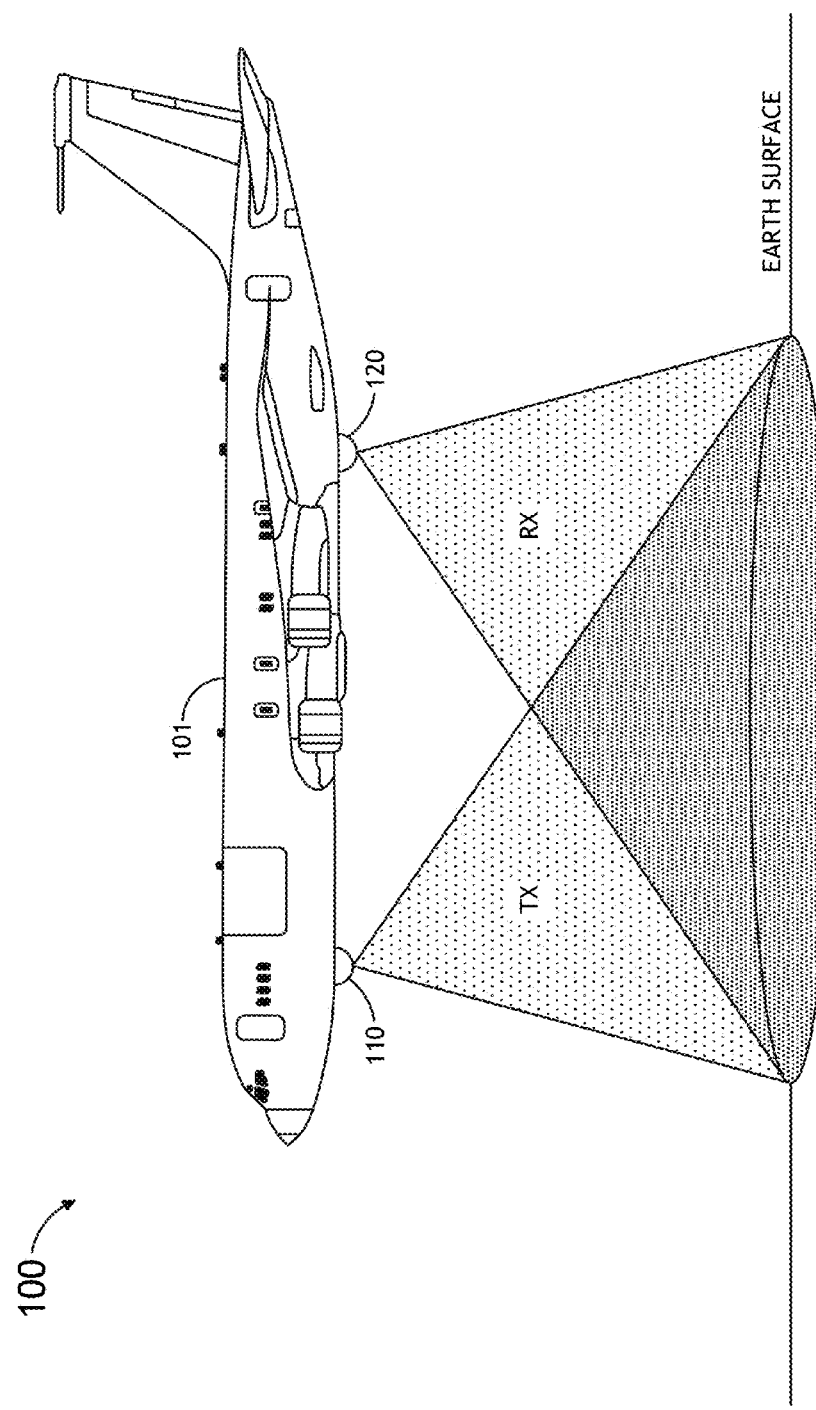

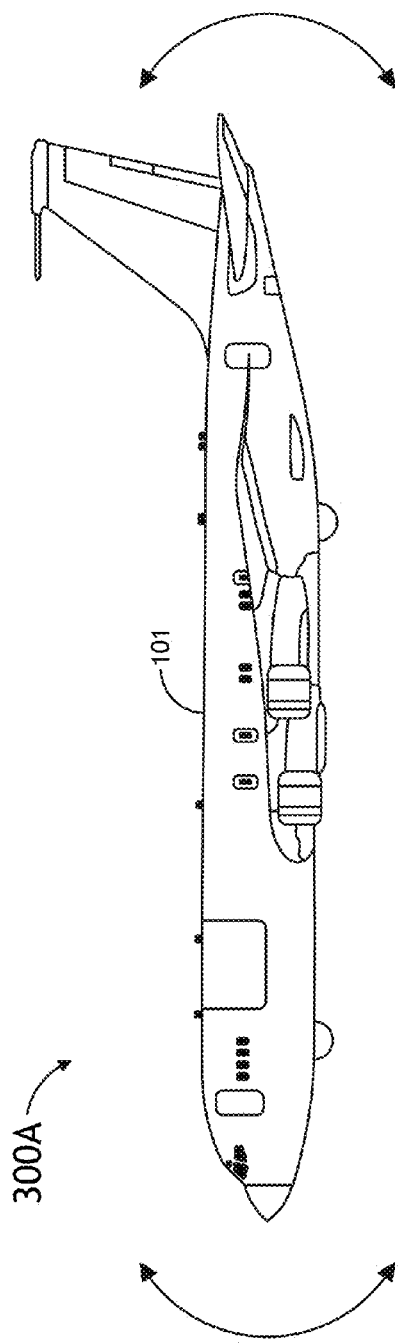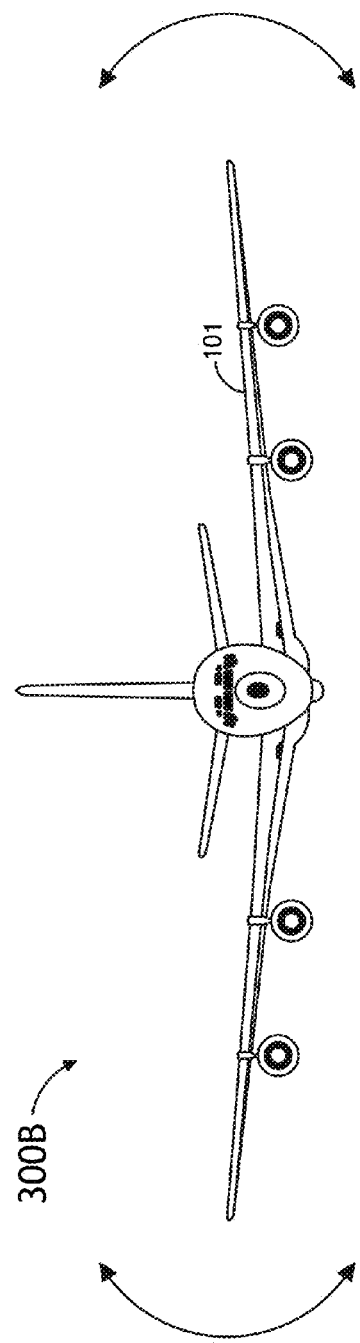
FIG. 3A
FIG. 3B

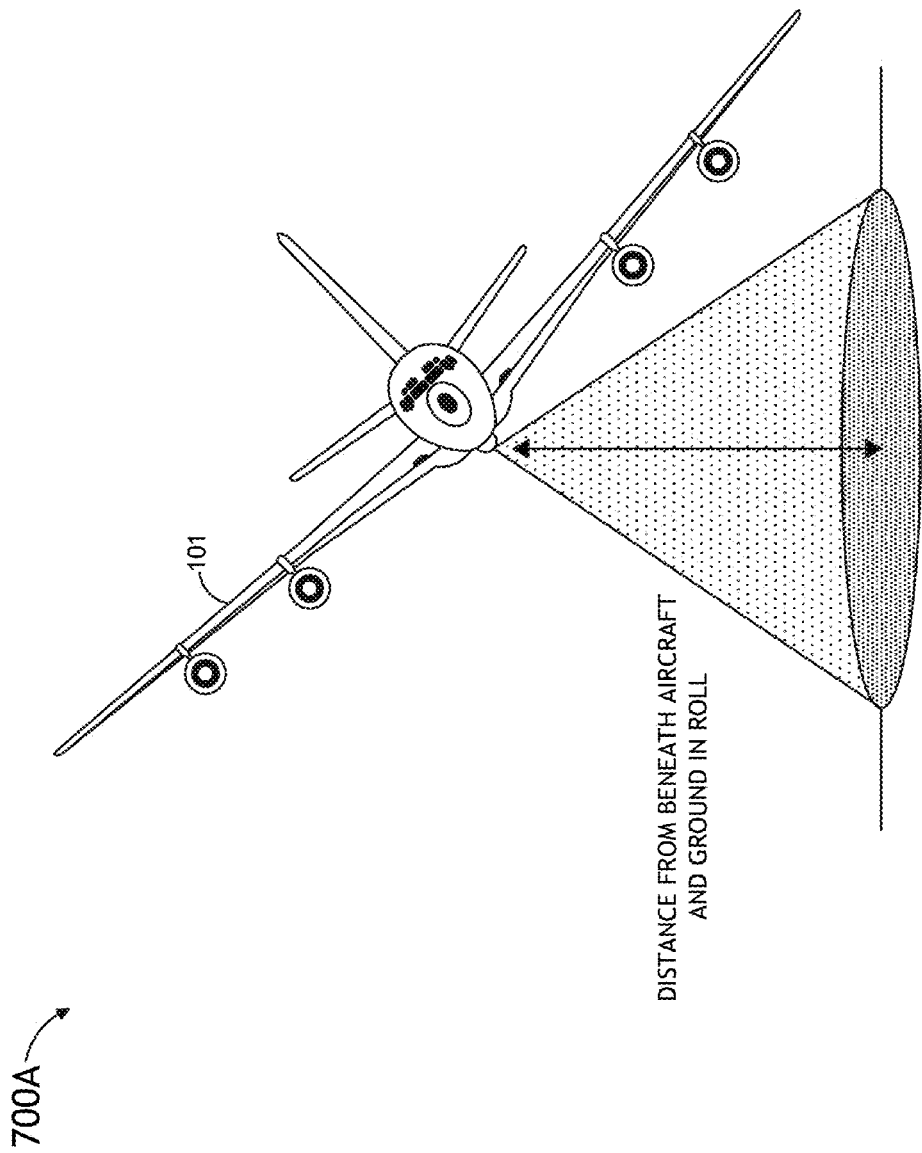

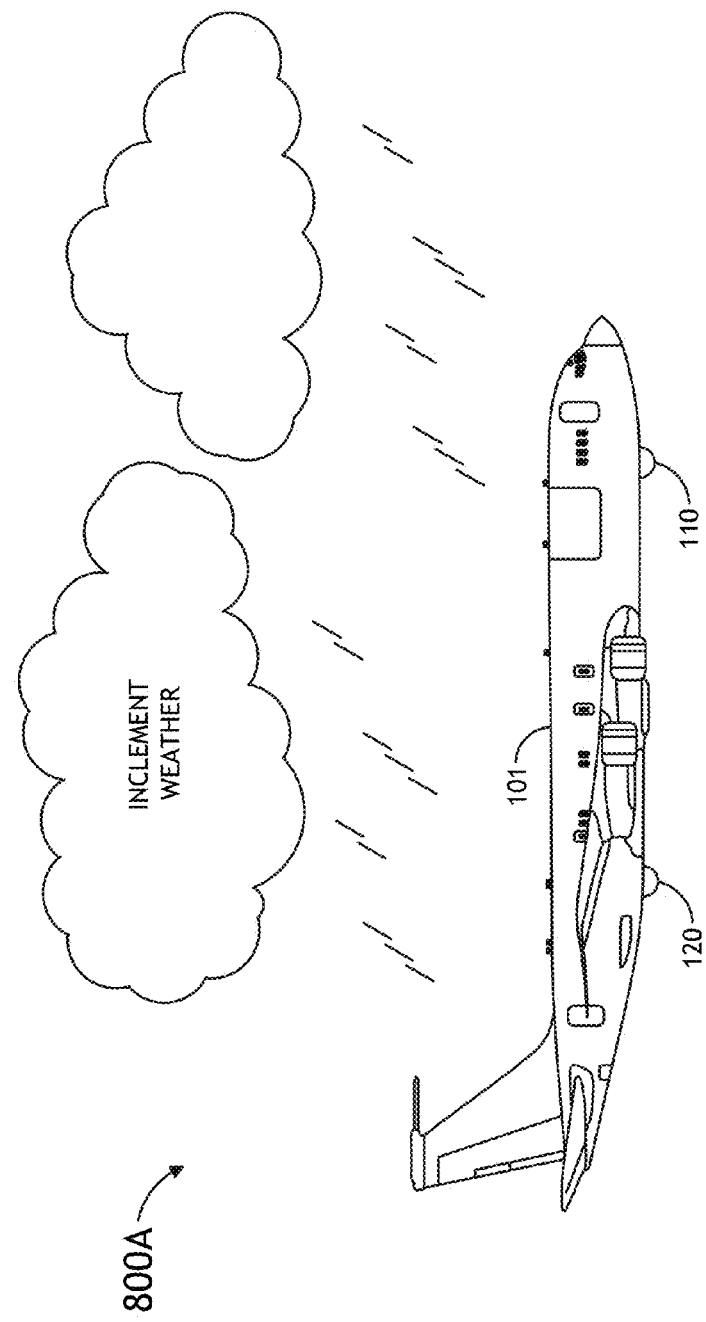

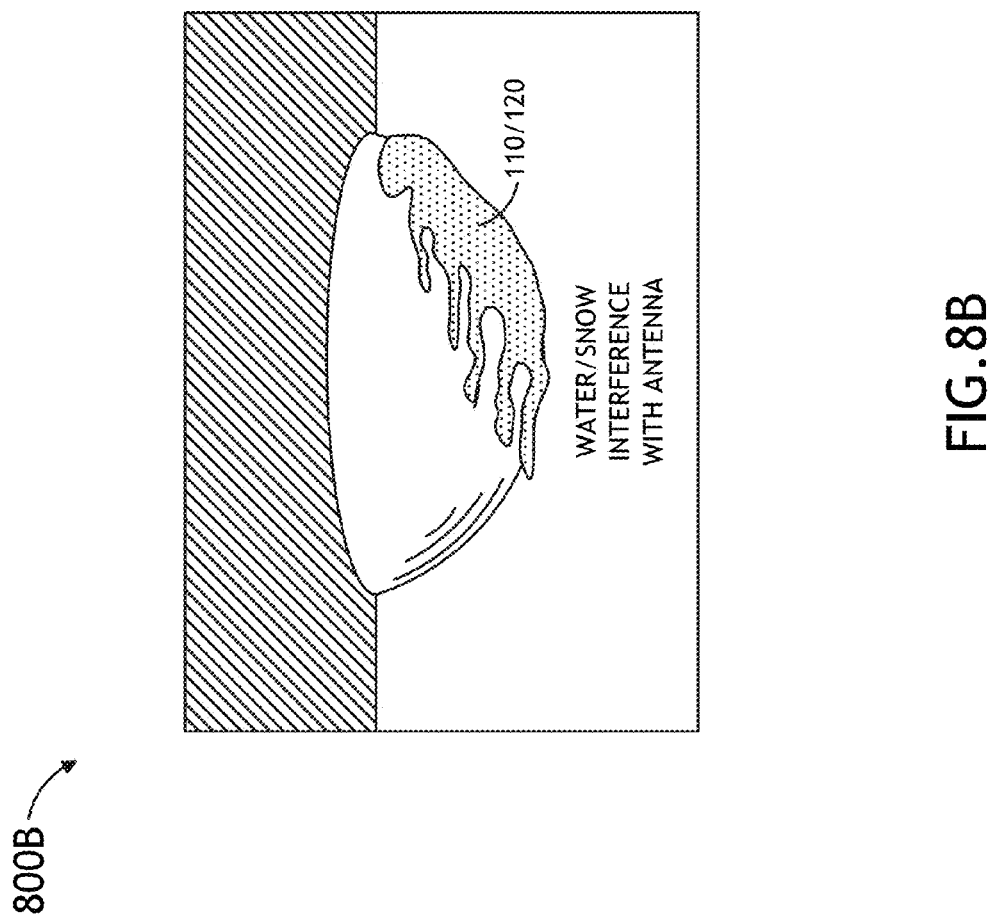

RADIO ALTIMETER FOR DETECTING ACCURATE HEIGHT

FIELD OF THE INVENTION

Embodiments of the invention are directed generally toward a method, apparatus, and system for determining altitude for aircraft.

BACKGROUND

Currently, during aircraft roll, pitch, and rainy conditions, radio altimeter performance is comprised and less accurate. Therefore, it would be desirable to provide a method, apparatus, and system configured to improve radio altimeter performance.

SUMMARY

Accordingly, an embodiment includes a method for adjusting a gain from a receiver antenna. The method may include accessing a radio altimeter data structure for antenna gain data. The antenna gain data may be associated with one or more antennas including a receiver antenna. Additionally, the method may include receiving aircraft maneuver data from a reference system. Furthermore, the method may include adjusting a gain from the receiver antenna based at least on the aircraft maneuver data.

Additionally, an embodiment includes a method for amplifying a signal power of a transmitter antenna based on weather conditions. The method may include determining whether precipitation attenuation of signal transmission is occurring. Additionally, the method may include amplifying a signal power of a transmitter antenna upon a determination that precipitation attenuation of signal transmission is occurring.

Also, an embodiment includes a system. The system may include a receiver antenna, at least one computer readable medium, and one or more processors. Each of the one or more processors may be coupled to one or more of the at least one computer readable medium. Additionally, the system may include the one or more processors being configured to execute instructions for accessing a radio altimeter data structure for antenna gain data, wherein the antenna gain data is associated with one or more antennas including the receiver antenna. The one or more processors may further be configured to execute instructions for receiving aircraft maneuver data from a reference system. The one or more processors may also be configured to execute instructions for adjusting a gain from the receiver antenna based at least on the aircraft maneuver data. Additionally, the one or more processors may further be configured to execute instructions for determining a radio altimeter height based on the adjusted gain.

Additional embodiments are described in the application including the claims. It is to be understood that both the foregoing general description and the following detailed description are exemplary and explanatory only and are not restrictive. Other embodiments of the invention will become apparent.

BRIEF DESCRIPTION OF THE FIGURES

Other embodiments of the invention will become apparent by reference to the accompanying figures in which:

FIG. 1 shows a depiction of an aircraft configured to utilize currently implemented radio altimeter processes;

FIG. 3A shows orientation change during a pitch maneuver;

FIG. 3B shows orientation change during a roll maneuver;

FIG. 7A shows a depiction of radio altimeter determined height of an aircraft during a roll maneuver of an exemplary embodiment;

FIG. 8A shows a depiction of a transmitter antenna and receiver antenna of a radio altimeter system during precipitation of an exemplary embodiment;

FIG. 8B shows a depiction of precipitation interference on a transmitter antenna or receiver antenna of a radio altimeter system during precipitation of an exemplary embodiment.

DETAILED DESCRIPTION OF THE INVENTION

Reference will now be made in detail to the subject matter disclosed, which is illustrated in the accompanying drawings. The scope of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Some embodiments of the invention include a method, apparatus, software or firmware, service, integrated circuit, and/or system configured to utilize one or more aircraft roll angles and/or aircraft pitch angles as inputs to a radio altimeter to compensate for an error associated with aircraft roll and/or pitch. Additionally, some embodiments may utilize weather radar output as an input to a radio altimeter; in such embodiments, the weather radar output is used as a basis for increasing power to a transmitter of or associated with the radio altimeter.

Referring now to FIG. 1, a depiction 100 of an aircraft 101 (e.g., a plane or helicopter) configured to utilize currently implemented altimeter processes is shown. The aircraft 101 may include a transmitter antenna 110 and a receiver antenna 120 of a radio altimeter system. The transmitter antenna 110 and the receiver antenna 120 may be located on (e.g., mounted or attached to) a bottom portion or portions of the aircraft 101. Using frequency-modulated continuous wave (FMCW) radar, a signal (e.g., one or more signals, a beam, a stream of signals, or the like) is transmitted by the transmitter antenna 110 to the surface (e.g., ground or water), and a reflected signal is received by the receiver antenna 120. Currently, an altitude is calculated or determined based on the difference between the transmitted frequency and the received frequency.

Figure 2A:
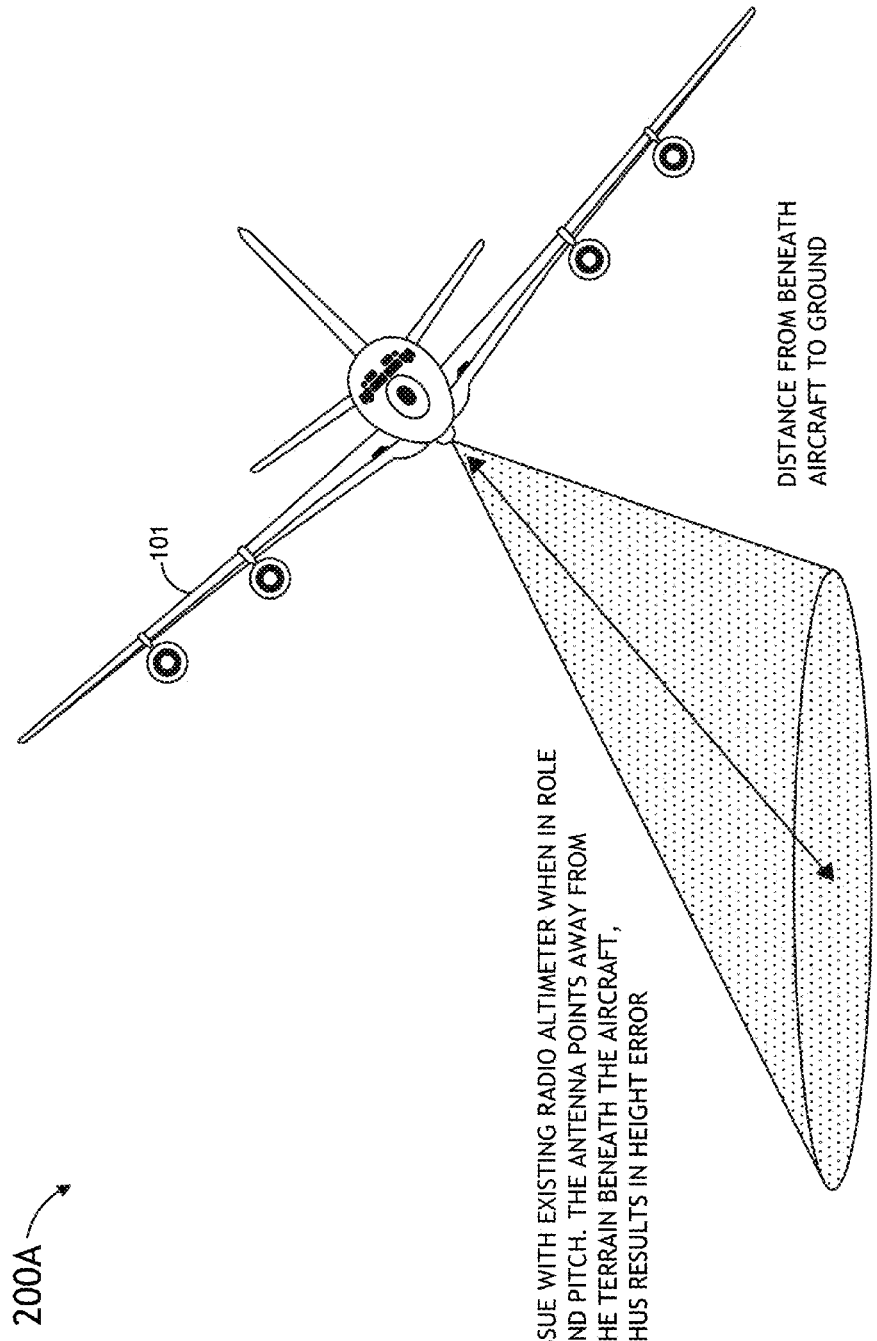
FIG. 2A depicts problems of currently implemented radio altimeter systems during a roll maneuver.
Figure 2B:
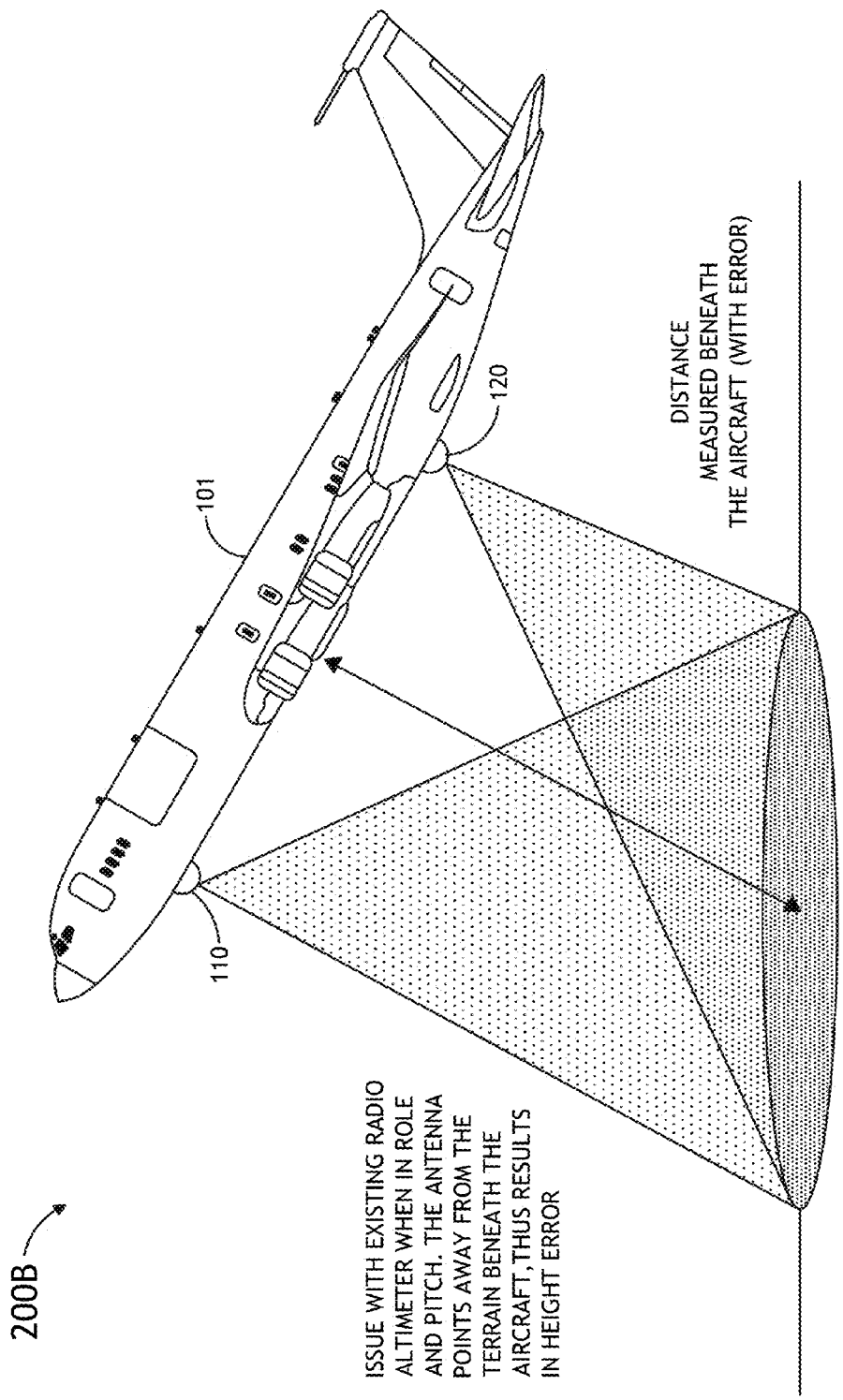
FIG. 2B depicts problems of currently implemented radio altimeter systems during a pitch maneuver.

Referring now to FIGS. 2A and 2B, depictions 200A and 200B depict problems of currently implemented radio altimeter systems of an aircraft 101 where radio altimeter error occurs due to roll and pitch maneuvers, respectively. During angled maneuvering (e.g., roll and pitch) by an aircraft 101, error (e.g., inaccuracy) is introduced into the calculated height beneath the aircraft 101 as compared to an aircraft flying with its wings level (e.g., as shown in FIG. 1). The error in the calculated height above the ground is caused at least in part by the indirectly (e.g., non-perpendicularly) reflected signal from the ground suffering attenuation due to radiation patterns of the antenna. In particular, FIG. 2A depicts a problem or issue with currently implemented radio altimeters which occurs when the aircraft 101 performs a roll maneuver. As shown in FIG. 2A, the transmitter antenna 110 and the receiver antenna 120 point away (e.g., are pointed in a significantly non-perpendicular direction relative to the ground) from the terrain beneath the aircraft 101, and this results in height error. FIG. 2B depicts a problem or issue with currently implemented radio altimeters which occurs when the aircraft 101 performs a pitch maneuver. As shown in FIG. 2B, the transmitter antenna 110 and the receiver antenna 120 point away (e.g., are pointed in a significantly non-perpendicular direction relative to the ground) from the terrain beneath the aircraft 101, and this results in height error.

Referring now to FIGS. 3A and 3B, exemplary depictions 300A and 300B depict particular directions in which the aircraft 101 may orient as the aircraft 101 performs a pitch maneuver or a roll maneuver, respectively. In some embodiments, sensors may be mounted on the aircraft to provide pitch angle measurements and roll angle measurements; for example, these sensors may be contained within a reference system 510 of the aircraft, such as an attitude and heading reference system (AHRS), an inertial reference system (IRS; sometimes referred to as an inertial navigation system (INS)), or the like. In some embodiments, the radio altimeter is configured to utilize the roll angles and the pitch angles (detected from sensors of the reference system) to compensate for the radiation pattern to calculate an actual height (e.g., vertical distance between the aircraft 101 and the surface) beneath the aircraft 101.

Figure 4:
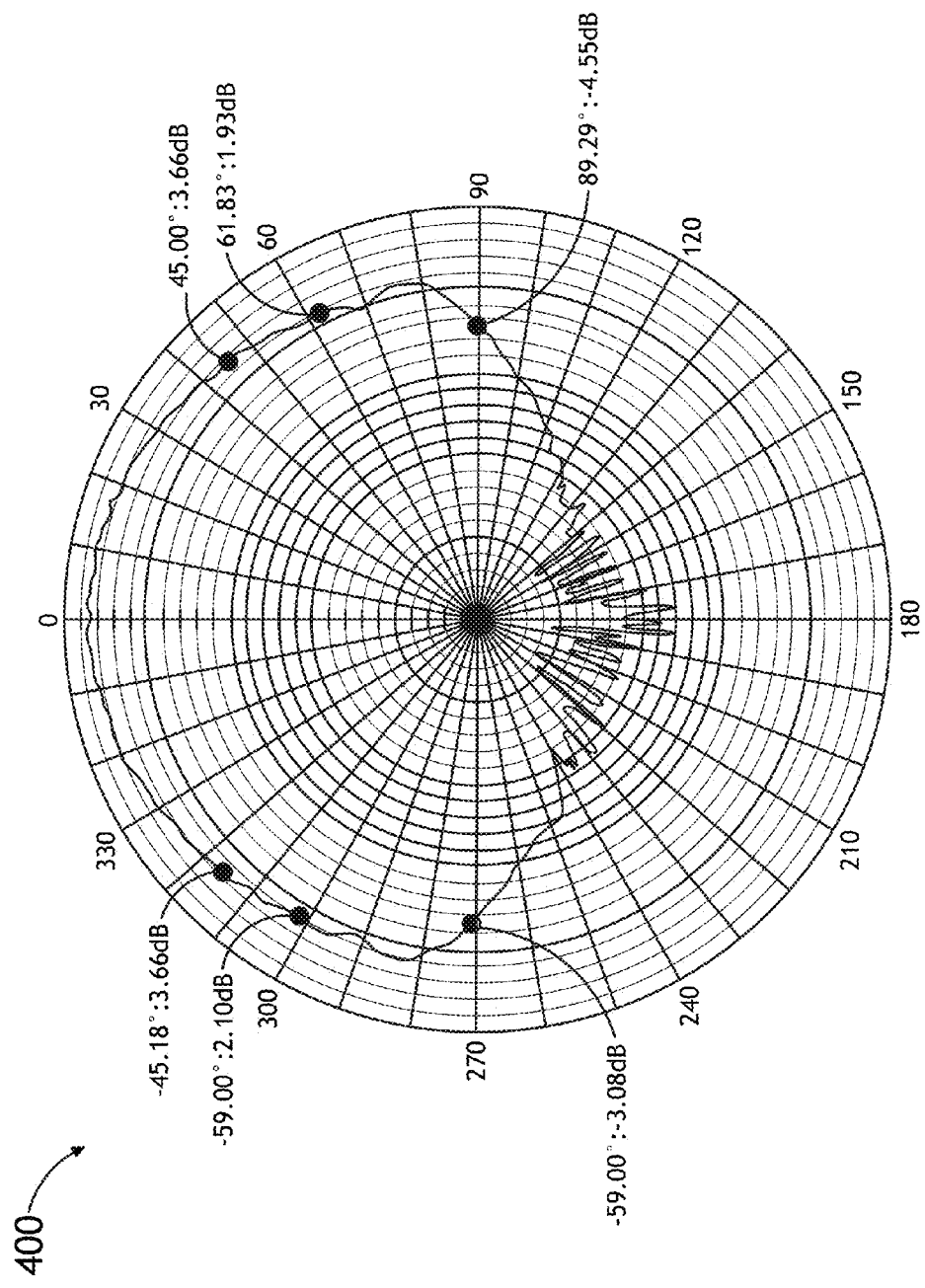
FIG. 4 shows an exemplary polar-coordinate plot (gain versus angle) of a typical radio altimeter antenna radiation pattern relative to an angle of the E-plane.

Referring now to FIG. 4, an exemplary polar-coordinate plot 400 (gain versus angle) of a typical radio altimeter antenna radiation pattern relative to an angle of the E-plane (i.e., electric field) is depicted. The antenna radiation pattern shows the gain of the antenna relative to the angle in the E-plane. As shown, for example, at zero degrees (i.e., along a bore site of the antenna) the antenna gain is at a maximum. As the E-plane angle increases (away from zero in either the positive or negative direction), the antenna gain reduces; this reduced gain results in a lower and weaker received reflected signal from the surface of the earth to the receiver antenna 120 of the radio altimeter.

Figure 5:
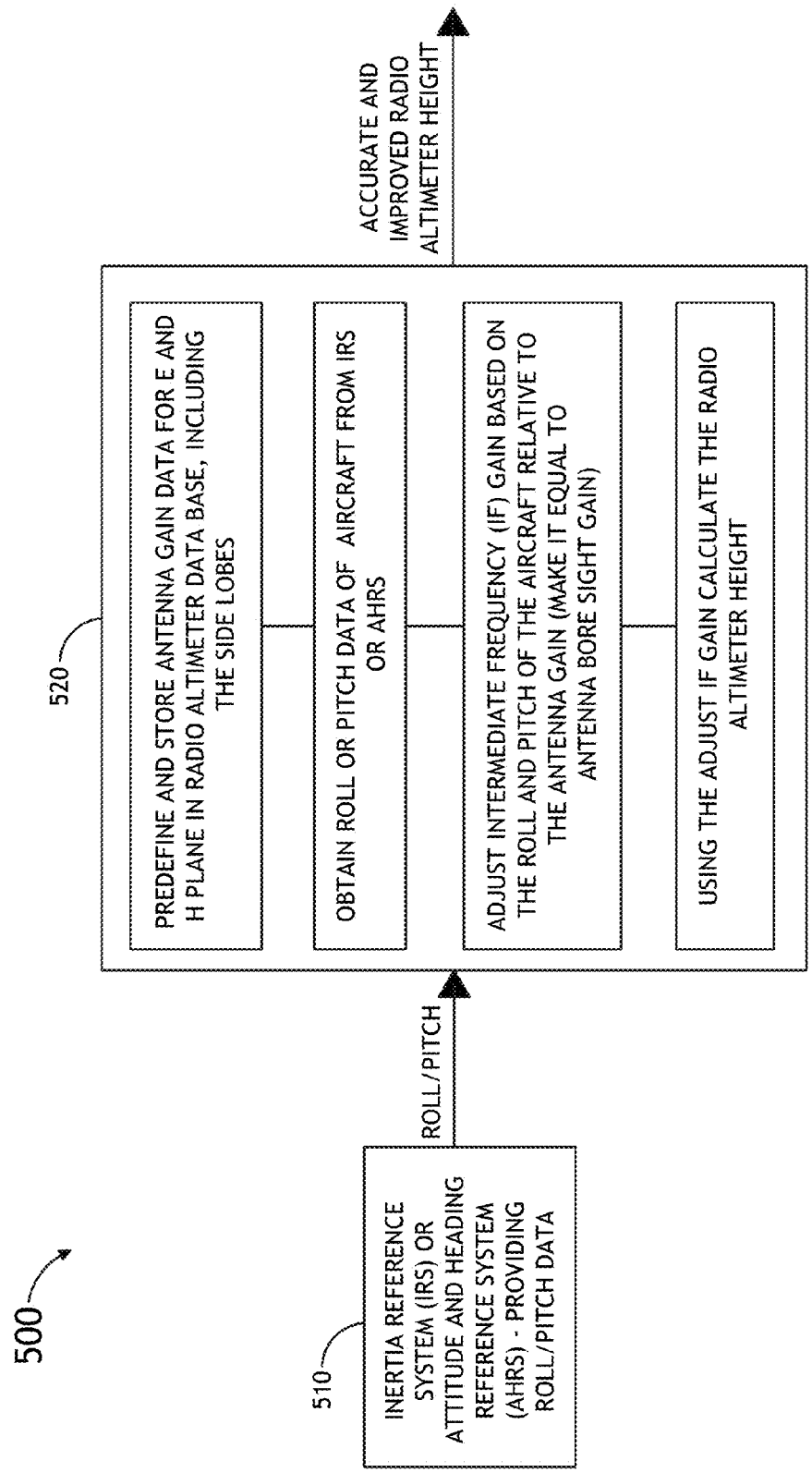
FIG. 5 shows a system including radio altimeter coupled to a reference system of an exemplary embodiment.

Referring now to FIG. 5, an exemplary box diagram 500 depicts an embodiment of radio altimeter 520 which receives inputs from a reference system 510. In some embodiments, the reference system 510 is configured to provide angled maneuver data (e.g., data containing information about angles of roll and/or pitch of the aircraft) to the radio altimeter 520, and likewise, the radio altimeter 520 may receive the angled maneuver data from the reference system 510.

Still referring to FIG. 5, in some embodiments, the radio altimeter 520 includes, stores, or creates a radio altimeter data structure (e.g., a radio altimeter database) in a computer readable medium (e.g., a cache, a buffer, a memory, a solid state drive, a hard disk drive, or other storage medium) communicatively coupled to a processor of the radio altimeter 520; in some embodiments, the radio altimeter 520 is configured to access a radio altimeter data structure (e.g., a radio altimeter database) stored in a non-transitory computer readable medium of another computing device. For example, the radio altimeter database may include predetermined antenna gain data of the E-plane (i.e., the electric field) and the H-plane (i.e., the magnetizing field) for one or more antennas (e.g., a transmitter antenna 110 and a receiver antenna 120) of or associated with the radio altimeter 520. Additionally, in some embodiments, the predetermined antenna gain data of the radio altimeter data structure may include, for each antenna, predetermined antenna gain data of expected gain relative to a particular angle of an incoming signal (e.g., a reflected signal) over a range of all possible angles; for example, the predetermined antenna gain data may include expected gain at the bore site angle (e.g., at approximately zero degrees), expected gain at angles corresponding to the main lobe of the radiation pattern of a particular antenna, and expected gain at angles corresponding to any side lobes of the radiation pattern of a particular antenna.

As shown in FIG. 5, some embodiments of the invention include the radio altimeter 520 or one or more processors of the radio altimeter 522 being configured to perform a method which improves the accuracy of determined height. For example, the method of some embodiments may include accessing a radio altimeter data structure for predetermined antenna gain data. The method may further include receiving roll or pitch data from a reference system 510 (e.g., an attitude and heading reference system (AHRS), an inertial reference system IRS, or the like). The method may also include adjusting an intermediate frequency (IF) gain from the receiver 120 based on the roll and/or pitch of the aircraft relative to an antenna gain of the receiver 120. Additionally, in further embodiments, the method may also include adjusting an intermediate frequency (IF) gain from the receiver 120 based at least on the roll and/or pitch of the aircraft relative to an antenna gain of the receiver 120 and based on the type (e.g., water, ground, or the like) of surface below the aircraft. For example, in some embodiments, the step of adjusting includes adjusting (e.g., increasing) the intermediate frequency gain to equal the expected gain at the antenna bore site angle based on the predetermined antenna gain data. Additionally, the method may include determining (e.g., calculating) radio altimeter height based on the adjusted intermediate frequency gain. Performance of the method results in more accurate and improved radio altimeter height being output to other avionics systems and/or equipment.

Figure 6:
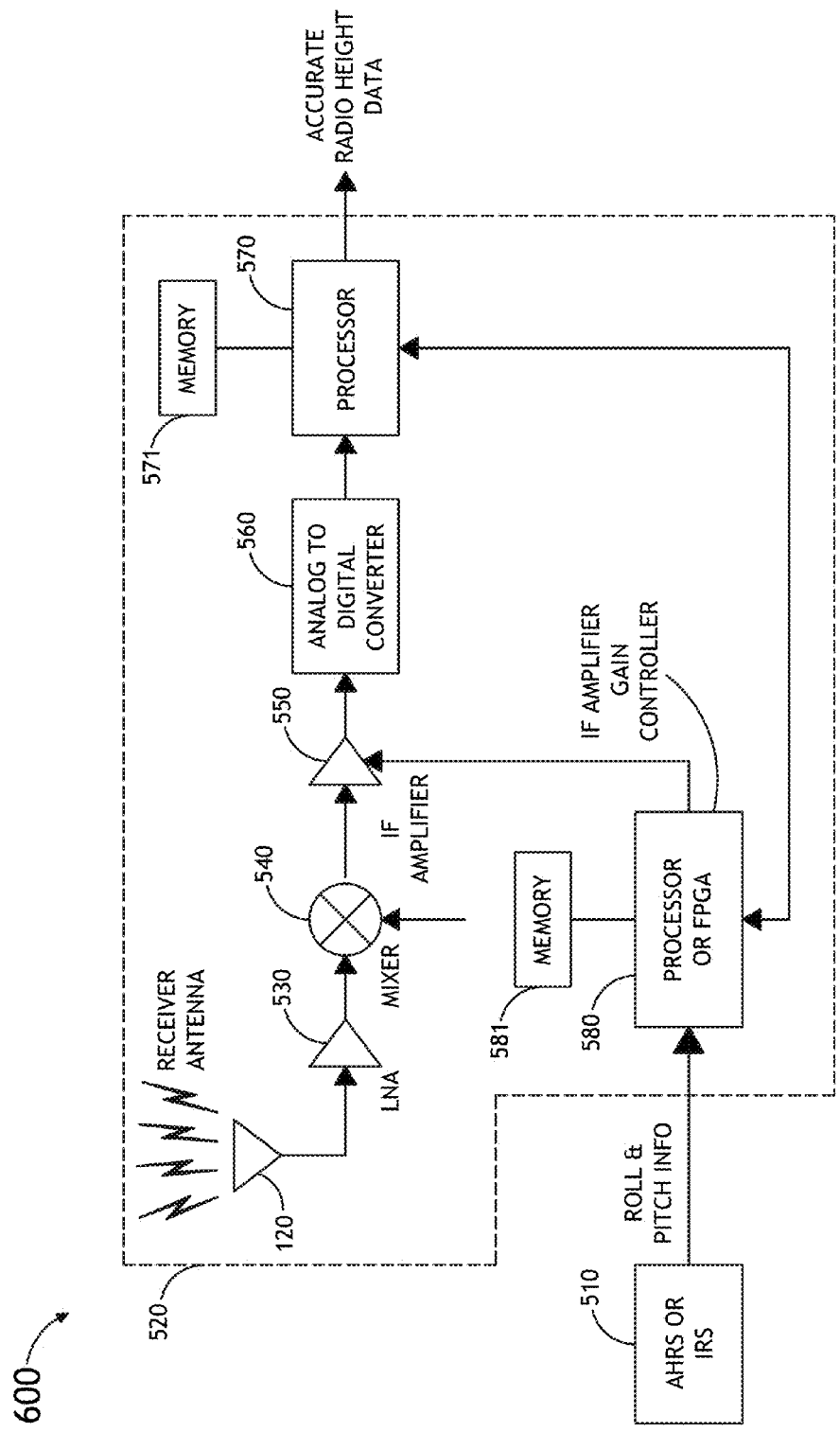
FIG. 6 shows a receiver block diagram of a system, which includes a radio altimeter coupled to a reference system of an exemplary embodiment.

Referring now to FIG. 6, an exemplary receiver circuit block diagram 600 of a radio altimeter 520 coupled to a reference system 510 of an exemplary embodiment is shown. In some embodiments, the radio altimeter 520 includes a receiver antenna 120, a low-noise amplifier (LNA) 530, a mixer 540, an intermediate frequency (IF) amplifier 550, an analog-to-digital converter 560, one or more processors 570, 580 (e.g., a first processor 570 and a second processor 580, wherein none, some, or all of the one or more processors 570, 580 may be implemented as a field programmable gate array (FPGA) or controller), one or more memories 571, 581 coupled to the one or more processors, a storage device, a transmitter antenna 110, or the like. The exemplary receiver circuit block diagram 600 of FIG. 6 illustrates how the electronic components of the radio altimeter 520 may be communicatively coupled to each other and other systems of an aircraft (e.g., a reference system 510).

Still referring to FIG. 6, for example, in a particular exemplary embodiment, a reflected signal may be received by the receiver antenna 120 and passed to a low-noise amplifier (LNA) 530, which may amplify the signal received by the receiver antenna 120 and then pass the amplified signal through a mixer 540 (e.g., a frequency mixer configured to shift the frequency of the amplified signal to an intermediate frequency), which outputs an intermediate frequency to an IF amplifier 550. The processor 580 may comprise or operate as an intermediate (IF) gain controller configured to execute instructions, based on roll and pitch information received from the reference system 510, to cause the IF amplifier 550 to adjust (e.g., increase) the gain of the intermediate frequency signal; the IF amplifier 500 may then pass the amplified intermediate frequency gain to the analog-to-digital converter 560. The analog-to-digital converter 560 may then convert the analog amplified intermediate frequency gain to a digital amplified intermediate frequency gain and pass the digital amplified intermediate frequency gain to a processor 570 configured to process the signal and determine an accurate height of the aircraft 101 even when the aircraft 101 is performing a roll or pitch maneuver.

Figure 7B:
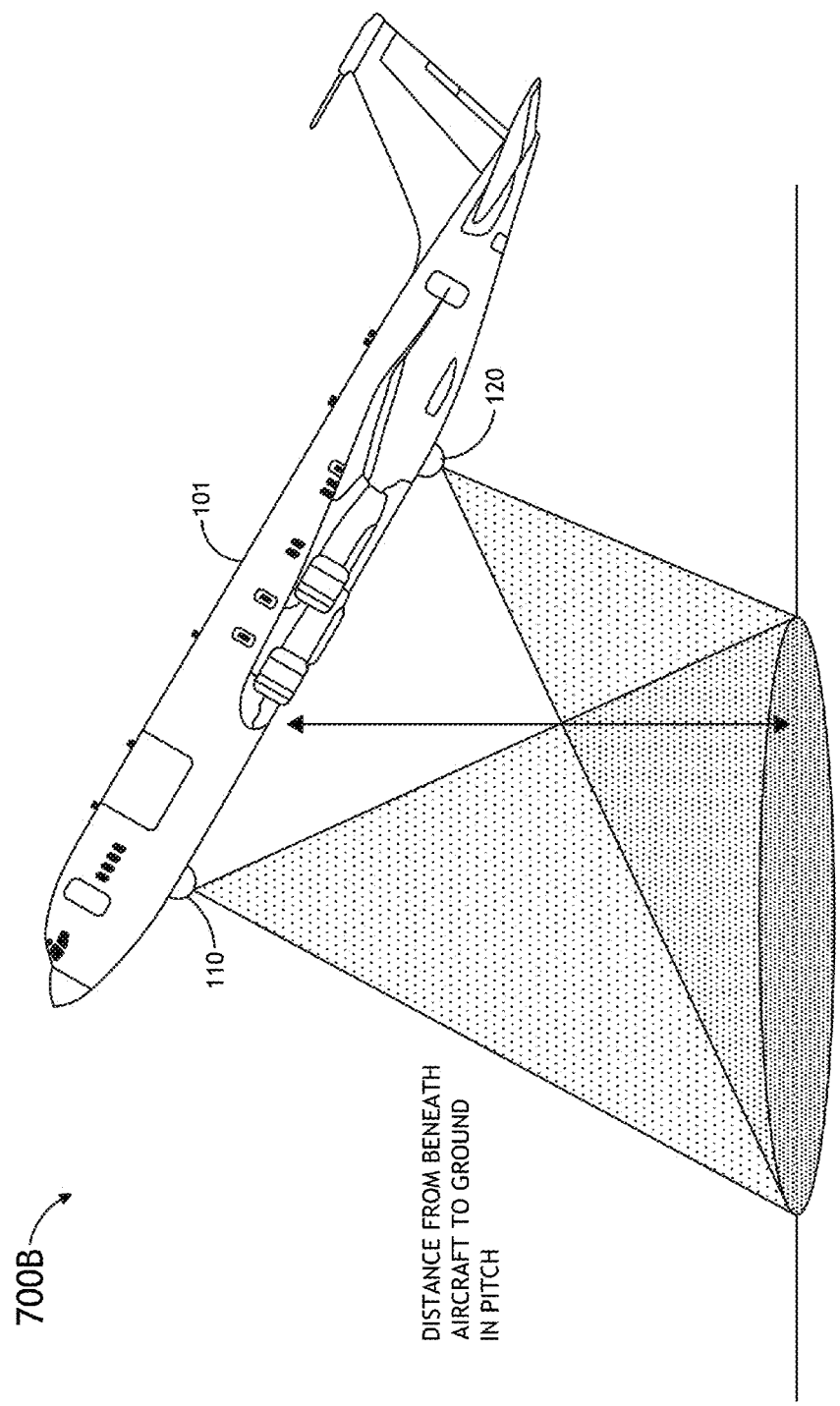
FIG. 7B shows a depiction of radio altimeter determined height of an aircraft during a pitch maneuver of an exemplary embodiment.

Referring now to FIGS. 7A-7B, depictions 700A, 700B illustrate improved determinations of height during roll and pitch maneuvers, respectively, of embodiments of the invention (as compared to heights determined by currently implemented radio altimeter systems as shown in FIGS. 2A-2B). In embodiments of the invention, the radio altimeter 520 determines the direct distance beneath the aircraft 101. Embodiments of the invention account for the loss of amplitude of the return signal (e.g., the reflected signal) received by the receiver antenna 120. Embodiments of the invention include adjusting an intermediate frequency (IF) gain based on the roll and pitch of the aircraft to compensate for the receiver antenna's 120 radiation pattern with respect to reception of a reflected signal at a non-perpendicular angle so that a signal processor receives an adjusted intermediate frequency gain corresponding to an equivalent intermediate frequency gain of a direct (e.g., perpendicular along the antenna bore site) reflected signal having a highest gain and least amount of noise.

Referring now to FIGS. 8A-8B, depictions 800A, 800B illustrate how weather conditions, such as precipitation (e.g., rain or snow), can interfere with antennas (e.g., receiver antenna 120, transmitter antenna 110, or the like) of or associated with the radio altimeter 520. Typically, precipitation attenuates signal transmission strength. Embodiments of the invention include amplifying signal power of a transmitter antenna during precipitation interference conditions 110 based on weather recognition to compensate for attenuation.

Figure 9:
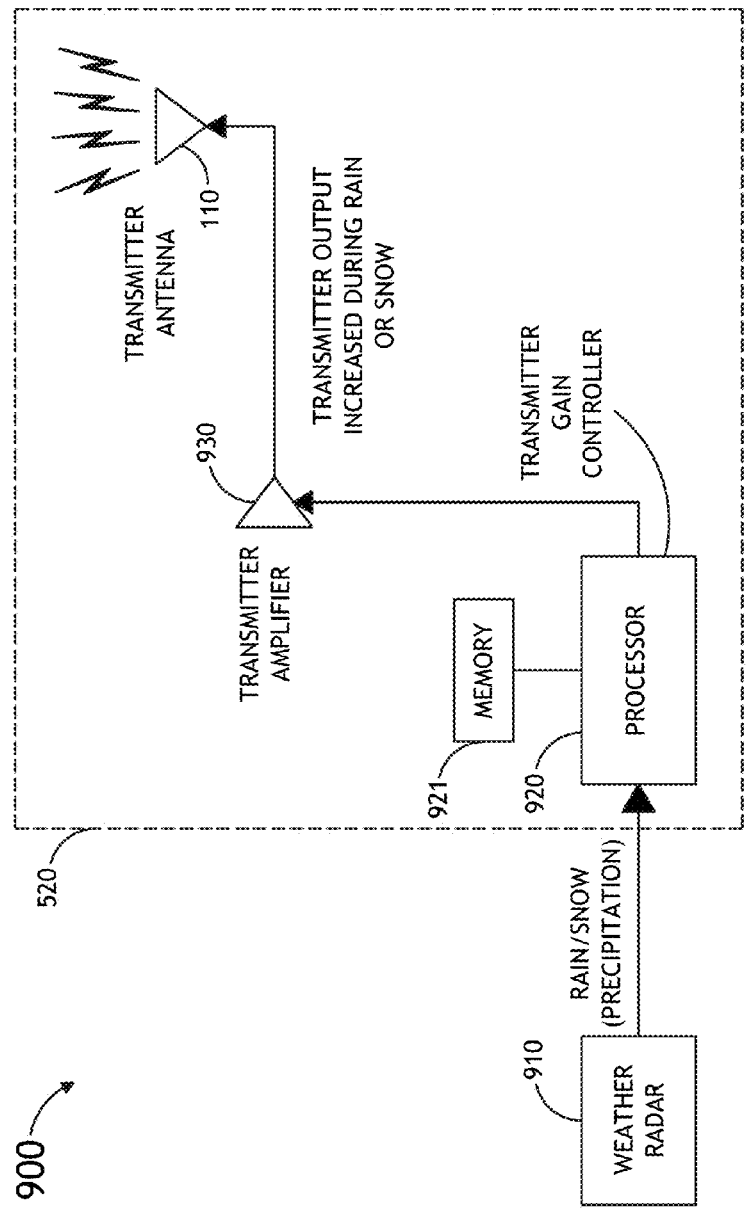
FIG. 9 shows a system including radio altimeter coupled to a weather radar system of an exemplary embodiment.

Referring now to FIG. 9, an exemplary transmitter circuit block diagram 900 of a radio altimeter 520 coupled to a weather radar system 910 of an exemplary embodiment is shown. In some embodiments, the radio altimeter 520 includes a transmitter antenna 110, one or more processors 920 (which may be implemented as a field programmable gate array (FPGA) or a controller (e.g., a transmitter gain controller)), one or more memories 921 coupled to the one or more processors 920, a storage device, a transmitter amplifier 930, a receiver antenna 120, or the like. The exemplary receiver circuit block diagram 900 of FIG. 9 illustrates how the electronic components of the radio altimeter 520 may be communicatively coupled to each other and other systems of an aircraft (e.g., a weather radar system 910).

Still referring to FIG. 9, for example, in a particular exemplary embodiment, a processor 920 may comprise or may operate as a transmitter gain controller. The processor 920 may be configured for receiving weather radar data from the weather radar system 910. The processor 920 may be further configured for determining whether precipitation attenuation of signal transmission is occurring based at least on the received weather radar data. Additionally, the processor 920 may be configured for determining a magnitude of the precipitation attenuation based at least on the weather radar data. Also, the processor 920 may be configured for executing instructions for causing a transmitter amplifier 930 to amplify a signal power of the transmitter antenna 110 based at least on the magnitude of the precipitation attenuation upon a determination that precipitation attenuation of signal transmission is occurring. Furthermore, in some embodiments, the processor 920 may be configured for executing instructions for causing a transmitter amplifier 930 to amplify a signal power of the transmitter antenna 110 based at least on the magnitude of the precipitation attenuation and currently calculated height of the aircraft 101 upon a determination that precipitation attenuation of signal transmission is occurring. Amplifying a signal power of the transmitter antenna 110 to compensate for precipitation attenuation results in a receiver antenna 120 receiving a reflected signal strength which corresponds (or approximately corresponds) to a reflected signal strength during ideal weather conditions (e.g. low humidity with no precipitation), and this improves the radio altimeter's accuracy in determining the height of the aircraft.

In some embodiments, the weather radar system 910 is located on-board the aircraft 101. While in other embodiments, the weather radar system 910 is located remotely from the aircraft 101; for example, the weather radar system 910 may be located at a communications ground station, at an air traffic control station, a satellite, on another vehicle (e.g., another aircraft, a ship (e.g., an aircraft carrier), an automobile, or the like), or the like.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the disclosed subject matter. The accompanying claims may present elements of the various steps in a sample order, and are not necessarily meant to be limited to the specific order or hierarchy presented.

It is believed that embodiments of the present invention and many of its attendant advantages will be understood by the foregoing description, and it will be apparent that various changes can be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method, comprising:
   accessing a radio altimeter data structure for predetermined antenna gain data, the predetermined antenna gain data being associated with one or more antennas including a receiver antenna implemented in a radio altimeter system of an aircraft, the predetermined antenna gain data including data of expected gains for reflected signals relative to possible angles for the reflected signals, the predetermined antenna gain further including an expected gain for a reflected signal at an antenna bore site angle, expected gains at angles corresponding to a main lobe of a radiation pattern of the receiver antenna, and expected gains at angles corresponding to side lobes of the radiation pattern of the receiver antenna;
   receiving aircraft maneuver data from a reference system;
   adjusting a gain from the receiver antenna based at least on the aircraft maneuver data and the predetermined antenna gain data, wherein adjusting the gain from the receiver antenna based at least on the aircraft maneuver data and the predetermined antenna gain data further comprises:
      increasing an intermediate frequency gain from the receiver antenna to equal the expected gain for the reflected signal at the antenna bore site angle based at least on the aircraft maneuver data and the predetermined antenna gain data; and
   determining a radio altimeter height based at least on the adjusted gain.

2. The method of claim 1, wherein the aircraft maneuver data includes at least one of aircraft pitch data and aircraft roll data.

3. The method of claim 1, wherein the reference system includes at least one of an inertial reference system and an attitude and heading reference system.

4. A method, comprising:
   receiving weather radar data;
   determining whether precipitation attenuation of signal transmission of a transmitter antenna implemented in a radio altimeter system of an aircraft is occurring based at least on the weather radar data;
   determining a magnitude of the precipitation attenuation based at least on the weather radar data upon a determination that the precipitation attenuation of the signal transmission of the transmitter antenna is occurring;
   amplifying a signal power of the transmitter antenna based at least on the magnitude of the precipitation attenuation upon determining the magnitude of the precipitation attenuation;
   accessing a radio altimeter data structure for predetermined antenna gain data, the predetermined antenna gain data being associated with one or more antennas including a receiver antenna implemented in the radio altimeter system of the aircraft, the predetermined antenna gain data including data of expected gains for reflected signals relative to possible angles for the reflected signals, the predetermined antenna gain further including an expected gain for a reflected signal at an antenna bore site angle, expected gains at angles corresponding to a main lobe of a radiation pattern of the receiver antenna, and expected gains at angles corresponding to side lobes of the radiation pattern of the receiver antenna;
   receiving aircraft maneuver data from a reference system;
   adjusting a gain from the receiver antenna based at least on the aircraft maneuver data and the predetermined antenna gain data, wherein adjusting the gain from the receiver antenna based at least on the aircraft maneuver data and the predetermined antenna gain data further comprises:
      increasing an intermediate frequency gain from the receiver antenna to equal the expected gain for the reflected signal at the antenna bore site angle based at least on the aircraft maneuver data and the predetermined antenna gain data; and
   determining a radio altimeter height based at least on the adjusted gain.

5. A radio altimeter system, comprising:
   a receiver antenna implemented in a radio altimeter system of an aircraft;
   at least one computer readable medium; and
   one or more processors, each of the one or more processors being coupled to one or more of the at least one computer readable medium, wherein the one or more processors are configured to execute instructions for:
      accessing a radio altimeter data structure for predetermined antenna gain data, the predetermined antenna gain data being associated with one or more antennas including the receiver antenna, the predetermined antenna gain data including data of expected gains for reflected signals relative to possible angles for the reflected signals, the predetermined antenna gain further including an expected gain for a reflected signal at an antenna bore site angle, expected gains at angles corresponding to a main lobe of a radiation pattern of the receiver antenna, and expected gains at angles corresponding to side lobes of the radiation pattern of the receiver antenna;
      receiving aircraft maneuver data from a reference system;
      adjusting a gain from the receiver antenna based at least on the aircraft maneuver data and the predetermined antenna gain data, wherein adjusting the gain from the receiver antenna based at least on the aircraft maneuver data and the predetermined antenna gain data further comprises:
         increasing an intermediate frequency gain from the receiver antenna to equal the expected gain for the reflected signal at the antenna bore site angle based at least on the aircraft maneuver data and the predetermined antenna gain data; and
      determining a radio altimeter height based at least on the adjusted gain.

6. The radio altimeter system of claim 5, further comprising:
   a transmitter antenna implemented in the radio altimeter system.

7. The radio altimeter system of claim 6, wherein the one or more processors are further configured to execute instructions for:
   amplifying a signal power of the transmitter antenna.

8. The radio altimeter system of claim 6, wherein the one or more processors are further configured to execute instructions for:
   determining whether precipitation attenuation of signal transmission is occurring; and
   amplifying a signal power of the transmitter antenna upon a determination that the precipitation attenuation of signal transmission is occurring.

9. The radio altimeter system of claim 6, wherein the one or more processors are further configured to execute instructions for:
   receiving weather radar data;
   determining whether precipitation attenuation of signal transmission is occurring based at least on the weather radar data; and amplifying a signal power of the transmitter antenna based at least on the weather data upon a determination that the precipitation attenuation of signal transmission is occurring.

10. The radio altimeter system of claim 6, wherein the one or more processors are further configured to execute instructions for:

receiving weather radar data;

determining whether precipitation attenuation of signal transmission is occurring based at least on the weather radar data;

determining a magnitude of the precipitation attenuation based at least on the weather radar data; and amplifying a signal power of the transmitter antenna based at least on the magnitude of the precipitation attenuation upon a determination that the precipitation attenuation of signal transmission is occurring.

\* \* \* \* \*